(12) United States Patent
Matsuo et al.

(10) Patent No.: US 9,071,952 B2
(45) Date of Patent: Jun. 30, 2015

(54) UNINTENTIONAL CALL DETECTION AND RESPONSE

(71) Applicant: GreatCall, Inc., San Diego, CA (US)

(72) Inventors: Kotaro Matsuo, San Diego, CA (US); Miguel Gonzalez, San Diego, CA (US)

(73) Assignee: GreatCall, Inc., San Diego, CA (US)

( * ) Notice: Subject to any disclaimer, the term of this patent is extended or adjusted under 35 U.S.C. 154(b) by 0 days.

(21) Appl. No.: 14/040,207

(22) Filed: Sep. 27, 2013

(65) Prior Publication Data

US 2015/0094034 A1 Apr. 2, 2015

(51) Int. Cl.
*H04W 4/16* (2009.01)

(52) U.S. Cl.
CPC ........................................ *H04W 4/16* (2013.01)

(58) Field of Classification Search
CPC ........... H04W 4/02; H04W 4/16; H04M 1/67; H04M 1/271; H04M 1/2745
USPC ......................... 455/414.1, 414.3, 417, 550.1
See application file for complete search history.

(56) References Cited

U.S. PATENT DOCUMENTS

| | | | |
|---|---|---|---|
| 8,489,066 B2 | 7/2013 | Imming | |
| 8,515,020 B1 | 8/2013 | Amerling | |
| 2008/0119217 A1* | 5/2008 | Coxhill | 455/550.1 |
| 2010/0255820 A1* | 10/2010 | Maly et al. | 455/414.1 |
| 2012/0171988 A1 | 7/2012 | Matsuo | |
| 2012/0182238 A1* | 7/2012 | Lee | 345/173 |

OTHER PUBLICATIONS

U.S. Appl. No. 13/956,234, filed Jul. 31, 2013, 45 pages.

* cited by examiner

*Primary Examiner* — Sam Bhattacharya
(74) *Attorney, Agent, or Firm* — Kilpatrick Townsend & Stockton LLP (57) ABSTRACT

Methods and systems for detecting unintentional calls placed to a call center. In some implementations, a device with telephone capability recognizes that it is being used to place a call, and automatically collects information usable to estimate whether the call is intentional or unintentional. For example, the device may record the timing of presses of a button used to initiate the call, the force used to press the button, or other parameters. The device may analyze the information, or may forward at least some of the information to the call recipient for analysis. When a suspected unintentional call is detected, the device may signal the user of the device, or other actions may be taken.

30 Claims, 6 Drawing Sheets

PERSONAL CLIENT PROFILE

Client number    555-555-555

Client Information
    Client Name:    Elizabeth Smith (Betty)
    Address:    123 Main St.
                  Smalltown, VA     Age: 86

Special Situations
    Lives alone

Contact Information
    Barbara Jones (Daughter) 555-666-6666
    John Smith (Son)        555-777-7777

Medical Conditions
    Asthma
    Elevated blood pressure
    High cholesterol Medications
    Blood pressure
    Cholesterol medication Medicine Allergies
    Penicillin Preferred Language
    German Trusted Network Contact Information

| Name | Phone | Email | Client? | # Contacts |
|---|---|---|---|---|
| Barbara Jones | 555-666-6666 | bjones@x.com | Y | 11 |
| John Smith | 555-777-7777 | jsmith@y.com | Y | 4 |
| Tom Davis | 555-888-8888 | tdavis@z.com | N | 2 |
| Mary Lewis | 555-999-9999 | mlewis@w.com | Y | 3 |

UNINTENTIONAL CALL DETECTION AND RESPONSE

BACKGROUND OF THE INVENTION

Some private organizations offer telephone-based assistance services. For example, a client of such a service may call a private response center to obtain navigation assistance, concierge services, health advice, or the like. In some cases, a customer service representative at the private response center may speak with the client and recognize that the client has an emergency, and may connect the client with the proper authorities such as a "9-1-1" public safety answering point or an equivalent.

Some calls to an assistance service may be unintentional on the part of the caller, and in some cases, the caller may not even realize that a call has been made. Because of the important nature of the assistance provided by the service, it is important that each call received by the service be thoroughly followed up, to ensure that a caller who is in need of urgent assistance receives it. However, the cost of following up on unintentional calls may be significant.

Public emergency services may experience similar issues.

BRIEF SUMMARY OF THE INVENTION

According to one aspect, a method of operating a device with telephone capability includes recognizing that an action at one or more user controls of the device with telephone capability indicates that a call is to be made to a particular telephone number, automatically collecting information usable to estimate whether the action was intentional or unintentional, and placing the call to the particular telephone number.

DETAILED DESCRIPTION OF THE INVENTION

The ensuing description provides preferred example embodiment(s) only, and is not intended to limit the scope, applicability or configuration of the disclosure. Rather, the ensuing description of the preferred example embodiment(s) will provide those skilled in the art with an enabling description for implementing a preferred example embodiment. It is understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, systems, structures, and other components may be shown as components in block diagram form in order not to obscure the embodiments in unnecessary detail. In other instances, well-known processes, procedures and techniques may be shown without unnecessary detail in order to avoid obscuring the embodiments. Furthermore, embodiments may be implemented by manual techniques, automatic techniques, or any combination thereof.

Figure 1:
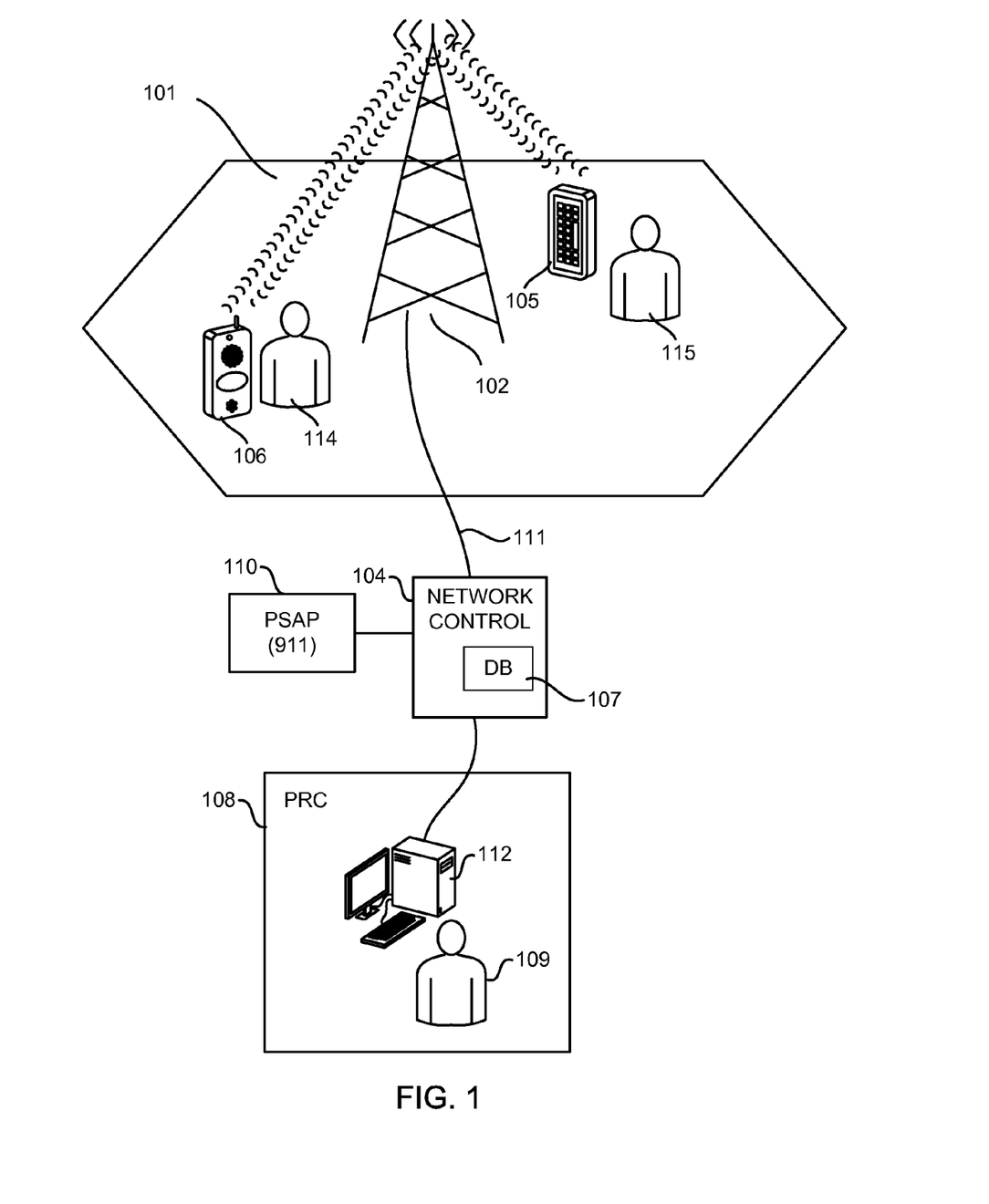
FIG. 1 illustrates a system in which the invention may be embodied.

FIG. 1 illustrates a system in which the invention may be embodied. Cell 101 is one cell of a cellular telephone network. Cellular networks are an especially efficient way to provide mobile telephone service. Each cell 101 is served by a respective base station 102, which may include an antenna mounted on a tower 103 or other structure. Each cellular telephone active in a particular cell can bi-directionally interact with the base station of the cell, enabling full duplex communication of data and/or voice. Each cell 101 is capable of communicating with mobile telephones within the respective cell according to a physical interface scheme (e.g., CDMA, LTE, GSM, GPRS, WiMax, etc.). Each base station 102 typically is capable of communicating simultaneously with several dozen or more different mobile telephones such as mobile telephone 105 or simplified communicator 106, which is described in more detail below.

Adjacent cells use different frequencies or coding to avoid interference. In this way, many mobile telephones can be supported using a limited spectra. The size and density of the cells 101 may be determined in part by the demand for service. While only one cell 101 is shown in FIG. 1, many other cells may be present, such that the cells collectively cover large contiguous areas. Special hand-off protocols may be used for maintaining communication with a particular telephone that moves from one cell to another during a call.

As shown in FIG. 1, each base station 102 communicates with a network controller 104. It will be understood that FIG. 1 is highly simplified, and network controller 104 represents a wide array of hardware, software, and other components performing a wide variety of functions. For example, network controller 104 may route calls between cells 101 and outside telephone providers, monitor telephone usage, maintain billing records for individual telephone accounts, perform diagnostic tests, and perform many other functions.

Network controller 104 may also include interfaces between the cellular network and other networks, organizations, or services.

Each active mobile telephone, such as mobile telephone 105, "registers" with a nearby base station, and network controller 104 keeps a database 107 listing which of the active mobile telephones is registered with which of the base stations. Network controller 104 uses database 107 to route incoming calls. For example, when a call is received at network controller 104 and intended to be routed to mobile telephone 105, network controller 104 consults database 107 to determine that mobile telephone 105 is registered with base station 102, and routes the incoming call accordingly.

The geographical locations of base stations 102 are fixed, and known to the operator of network controller 104. Thus, by virtue of database 107, network controller 104 "knows" at nearly all times the location of every active mobile telephone subscribed with the operator of network controller 104, at least to the accuracy of the size of cells 101. The size of each cell depends on the expected density of mobile telephones in a given area, on the topology of the surrounding landscape, and other factors, but typically cells range from a few hundred yards to several miles across. A particular geographical area may be served by more than one telephone service provider. Different telephone service providers may share network infrastructure, or may maintain separate controllers, base stations, towers, and other hardware. Each telephone service provider similarly "knows" the locations of all of its active subscribed mobile telephones.

While embodiments of the invention are described mainly in the context of cellular mobile communication, it will be recognized that the invention is not so limited, and embodiments may use fixed "landline" telephones, satellite telephones, voice-over-internet-protocol (VOIP) communications, or other kinds of communications devices.

A private response center (PRC) 108, is reachable via network controller 104, for example by dialing a particular telephone number. Private response center 108 may be operated, for example, by a response service provider who offers personalized assistance to clients who subscribe to the service. In some embodiments, the response service provider may offer personal health management advice, concierge services, navigational assistance, technical support for telephones used in conjunction with the service, or other kinds of personalized services deliverable by telephone. Private response center 108 may be staffed by customer service representatives 109 who answer inquiries from clients of the service. Such a service may especially appeal to clients with health or other impairments. For example, the service could include weekly or daily calls to the client for verification that the client is doing well, and if not, the customer service representative may offer to contact a family member, health care provider, or other resource that may be helpful to the client. The service could include these and other services sold as a package. Alternatively, PRC 108 may be a fully automated service designed to operate without human intervention.

Private response center 108 is not intended to be a substitute for a public safety answering point (PSAP) 110. A client of the service offered by private response center 108 would still be expected to dial 9-1-1 to reach PSAP 110 in the event of an emergency. However, while embodiments of the invention are described primarily in the context of a private response center, the invention is not so limited and may be embodied in a public facility such as PSAP 110. For example, as part of the Next Generation 9-1-1 initiative underway in the United States and Canada, it is expected that the capabilities and responsibilities of public safety answering points such as PSAP 110 will expand to include capabilities and components similar to those described herein for PRC 108. It is intended that the appended claims encompass both public and private facilities.

In one example scenario, the service provider that operates private response center 108 may also be a cellular telephone service provider, and may offer a private assistance service as an adjunct to cellular telephone service. The private response center 108 can be contacted for non-emergency service through a phone number, speed dial or other shortcut, for example by activating a 5 and * key combination on a telephone. The connection 111 between network controller 104 and private response center 108 is schematic. The actual connection could be by way of the Internet, a wireless connection, a voice-over-Internet-protocol (VOIP) connection, or a cellular telephone connection, or private response center 201 could be reached through a conventional wireline telephone system, or any other suitable connection method that enables a telephone user to reach private response center 108. Private response center 108 may be reachable via multiple methods.

PRC 108 includes a computer system 112 that may be used for various functions. For example, information about calls from clients may be displayed to customer service representative 109. Computer system 112 may store personal information gathered from clients that may be helpful in rendering assistance to the clients. Computer system 112 may assist customer service representative 109 in the performance of his or her job, for example automating telephone dialing and the like. While computer system 112 is illustrated as a single computer, it will be recognized that the term "computer system" encompasses many different kind of installations, including systems of multiple computers linked together. The multiple computers may be co-located or widely dispersed.

FIG. 1 also illustrates a client 114 of PRC 108, currently positioned in cell 101. Client 114 uses a simplified communications device 106, described in more detail below. Another cellular telephone user 115 uses fully-featured mobile telephone 105. User 115 may or may not be a client of PRC 108. Similarly, other users or clients may use other kinds of telephones, for example a conventional cellular telephone that includes a keypad, display, speaker, and microphone, but does not have the capability to be customized by loading application programs. Other kinds of portable devices may be used as well, for example personal digital assistants that have telephone capability, and the like.

Figure 2:
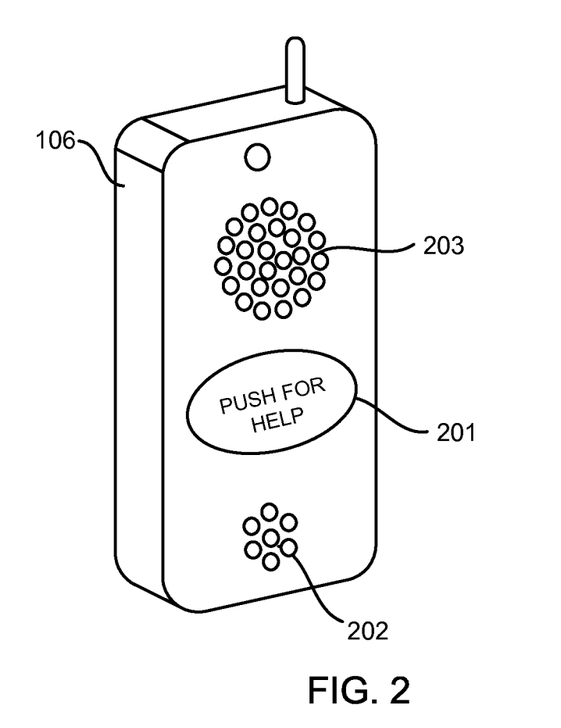
FIG. 2 illustrates simplified communications device in accordance with embodiments.

FIG. 2 illustrates simplified communications device 106 in more detail, in accordance with embodiments. Example communications device 106 may internally be a fully-featured cellular telephone, but has a simplified input interface comprising only one button 201. Communications device 106 may also be referred to as a "personal security device" or an "emergency communicator." A client of private response center 108 may wear communications device 106 on his or her person, and can use it to contact private response center 108 whenever assistance is needed. For example, communications device 106 may be configured to dial private response center 108 when button 201 is pressed. This greatly simplified input interface may be especially helpful to clients with impairments such as poor vision or coordination that make it difficult to operate a conventional cellular telephone that has many small keys. The single-button interface assures that private response center 108 will be called without the client having to press a sequence of keys. In the event of an emergency, private response center 108 may route the call to the proper authorities, if necessary. Communications device 106 further includes a microphone 202 and a speaker 203, enabling telephone or telephone-like communication.

In some embodiments, communications device 106 periodically reports its geographical location to PRC 108. Communications device 106 may determine its location using an internal global positioning system (GPS) receiver, by requesting that the cellular network estimate the location of communications device 106, or by any other suitable method or combination of methods. Systems and methods of monitoring the location of a communications device are described in more detail in U.S. patent application Ser. No. 13/026,158 filed Feb. 11, 2011 and titled "Systems and Methods for Determining Caller Locations", the entire disclosure of which is incorporated by reference herein for all purposes.

Referring again to FIG. 1, user 115 may also be a client of PRC 108, but rather than using a special-purpose communicator such as communications device 106, user (and client) 115 uses fully-featured cellular telephone 105, which may be a so-called "smart phone". A smart phone includes a processor and operating system such that it can be customized by installing application software selected by the user. In the example of FIG. 1, user 115 may have installed a special application that provides quick access to PRC 108, performs periodic location determinations and reports them to PRC 108, and the like. The application may also enable PRC 108 to contact user 115 in a secure manner.

In embodiments where a device such as communications device 106 or cellular telephone 105 periodically determines and reports its location, the location determinations may be performed as accurately as possible, while minimizing network data traffic associated with some location determining methods. However, the location determinations may not provide information as detailed as might be desired. For example, communications device 106 or cellular telephone 105 may be indoors, and not able to obtain a position fix using a GPS receiver. Location determinations provided by the cellular telephone network may not be as precise as may be desired to locate a user of the device.

Figure 3:
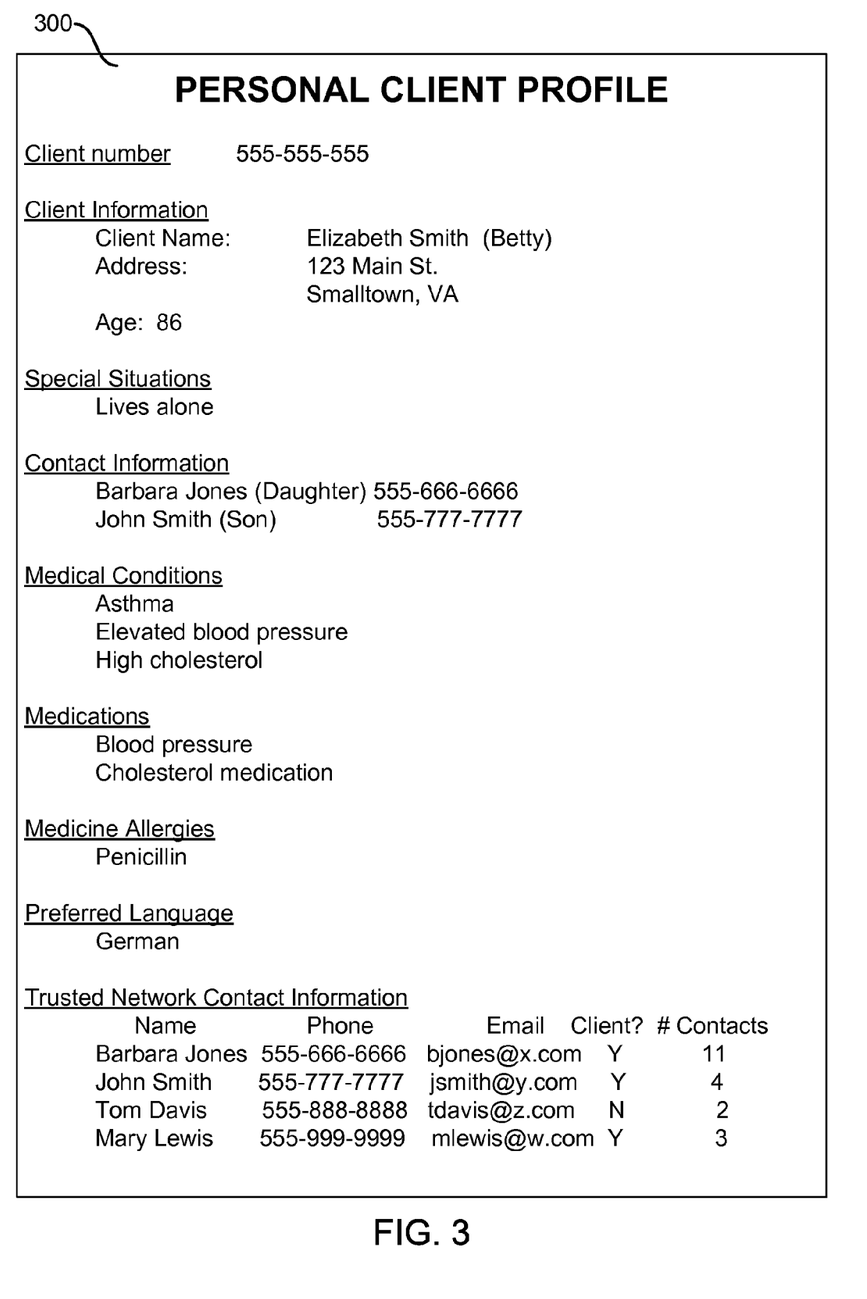
FIG. 3 illustrates an example personal profile.

Preferably, PRC 108 collects profile information about each of its clients and stores the profile information, for example at computer system 112. When a client contacts PRC 108 for assistance, that client's profile may be retrieved and presented to the answering customer service representative 109, so that the customer service representative can better provide assistance. FIG. 3 illustrates an example personal profile 300, for example of client 114 of PRC 108.

Example personal profile 300 includes such information as the client's name and address, medical conditions, current medications, and other information. Also included is a listing of contact information for other persons or entities, some of whom may form a trusted network designated by the client, for example upon enrollment of the client in the service provided by PRC 108. In this example, the entities in the trusted network are people, for example relatives, neighbors, or friends of the client. The trusted network could also include other kinds of entities, for example a nursing home or assisted living facility where the client resides, a school the client attends, a church office, or another kind of entity. Preferably, many clients of PRC 108 have identified trusted networks and have provided contact information for entities in their respective trusted networks.

Some or all of the entities in the trusted network may be automatically notified whenever the client contacts PRC 108 for assistance. Alternatively, a customer service representative may initiate a contact with one or more members of the trusted network when needed. The customer service representative may select which of the trusted network members to contact based on the nature of the reason for the client's call to PRC 108. For example, if the client calls with a medical issue, the customer service representative may notify the client's family (in addition to contacting official emergency services personnel, if appropriate). If the client calls to report that he or she has fallen, the customer service representative may also notify a trusted neighbor of the client, who may be nearby and able to render immediate assistance.

In some cases, a call to PRC 108 may be placed unintentionally. For example, client may simply mis-dial a number and call PRC 108 by mistake, or may accidentally select the number of PRC 108 from a list of numbers stored on his or her phone, rather than a different number that was intended to be selected. In such a case, the client may recognize that the call was erroneous and inform the answering customer service representative, such that the effect of the call is minimal to all parties.

However, in other cases, the client may call PRC 108 without realizing that he or she has made a call. For example, a phone carried in the client's pocket may be activated by pressure from a seatbelt, a package being carried by the user, an object against which the user leans, or by another common influence. (This occurrence is common enough to have acquired a colloquial name—the "pocket dial".) Other scenarios may also result in a call that is unintended and of which the caller is unaware. For example, a user may inadvertently place an object on his or her phone that causes a call to be made.

Such inadvertent calls may be especially likely to occur if a client uses a device with a simplified user interface such as emergency communicator 106, since only a single button press is required to connect to PRC 108. Since the caller does not know that the call was accidentally placed, he or she may not respond to the customer service representative answering the call, making it difficult for the customer service representative to determine whether the caller is simply unaware of the call, or whether the call was intentional and the caller is incapacitated, injured, or otherwise unable to communicate.

Because of this uncertainty and the importance of the service offered by PRC 108, it is important that each and every call be resolved if at all possible. For example, if the call ends, the customer service representative may immediately try to call back to the caller's phone or other device, in hopes that the caller will answer and can explain that the call was inadvertent, or can receive the assistance he or she needs.

However, if the phone has been silenced or if it is under the object that caused it to make the call, the user may not hear the return call. In that situation, PRC 108 may try multiple callbacks, may try to contact other persons listed in the caller's personal profile to see if one of them may know the client's status, or may take other measures. These follow-up activities can be time consuming, and may require additional staff.

PRC 108 may wish to know when an incoming call might have been unintentional, or may wish to reduce the number of calls in which no verbal connection between a client and a customer service representative is established. Embodiments of the invention may use one or more of a variety of techniques to estimate whether a call was intentional or unintentional.

In some embodiments, the device used to make the call may take actions that help estimate whether a call is intentional or unintentional. For example, the device may collect information usable to estimate whether a call is intentional or unintentional.

The device itself may evaluate the information, and take an action when it estimates that the call may have been unintentional. Additionally or alternatively, the device may forward some or all of the collected information to the call recipient (e.g. PRC 108), for evaluation there.

For example, the device may monitor and keep track of the timing of any actuations of its input interface such as a keypad, input screen, or single button. Unusual patterns in the timing of keystrokes or similar actions may be suggestive of an unintentional call.

In one example, if the device is a fully featured phone and the keystrokes that resulted in the call occurred over the span of several minutes, it may be considered more likely that the resulting call was unintentional than if the keystrokes occurred over the span of a few seconds as would be more typical of a usual intentional call. Such an elongated dialing sequence may be thought to indicate that the keystrokes were caused by movement of a phone in a user's pocket, or a similar mechanism. In another example, if the device is an emergency communicator having only one button, such as emergency communicator 106, a button activation lasting more than some predetermined interval may be suggestive of an unintentional call. For example, a button press lasting several minutes may be thought likely to be caused by an object resting on the device, rather than a press by a person's finger.

In some embodiments, the device collects information about the timing of the actions used to place all calls. For example, a processor within the device may register the pressing and release of keys, icons, or buttons on the device, and record the amount of time between these actions, for analysis by the device, by PRC 108, or both.

When the device itself estimates that a call may have been unintentional, it may take appropriate actions. For example, the device may signal the user by producing a ringtone, by vibrating, or by another action, to try to bring the user's attention to the phone. If the user is unaware that a call has been made, he or she may "answer" the ring and be informed by the customer service representative that the call was made. The user may be able to explain that the call was unintentional, and PRC 108 can close its file on the call. In another example, if the device estimates that the call is unintentional, it may inform PRC 108 of that fact, and PRC 108 may signal the device to ring, vibrate, or otherwise signal the user.

In some cases, a user may have silenced his or her phone or communicator, or may have disabled a vibration feature, making it difficult to gain the client's attention with the device. In some embodiments, PRC 108 may command the device to ring or vibrate despite the user's settings. Preferably, the least intrusive methods of gaining the user's attention may be tried first, and in some embodiments, only relatively unobtrusive measures may be tried, in order to avoid potential embarrassment or offense, should the client be at the theater or another location where a ringing telephone would be considered offensive.

Or, as is discussed above, the device may forward the information it collected to PRC 108, which can perform the analysis to estimate whether the call was unintentional. If so, PRC 108 may signal the device to ring, vibrate, or take another action.

Communications between the device and PRC 108 may be done in any suitable way, but may conveniently be done using short message service (SMS) messages. These messages allow devices to exchange short, often text-based messages, and may be sent and received while a phone call is in progress. The messages need not be visible to the user of the device, and can therefore be used to send control commands to a device suitably programmed to act on the commands.

For example, communicator 106 may contain special programming to enable it to recognize and act on commands unique to PRC 108. Similarly, a special application program may be installed on a general-purpose "smart" phone, to configure it to recognize and respond to commands from PRC 108. In other embodiments, audible tones such as DTMF (dual-tone multi-frequency) tones may be sent over the voice channel and recognized by the device or by PRC 108 as specialized commands or responses. Other methods are possible, such having the communicator 106 or other device periodically make a data call to access commands that are uploaded to an internet site, or having PRC 108 place a voice call to communicator 106 and utilize the call waiting feature available on telephone networks to signal communicator 106 of a pre-programmed communication.

Other kinds of information usable to estimate whether a call may be unintentional may be collected. For example, communicator 106 may include a force sensor that measures the amount of force used to actuate button 201, and communicator 106 may collect the force information when a call is initiated. Unusual amounts of force, for example more force than a typical human finger or thumb can exert, may be suggestive that a call is unintentional, and was the result of leaning against the button, placing a heavy item on the device, or a similar mechanism. The force sensor may be of any suitable type, for example a strain gauge load cell, a piezoelectric device, a force sensitive resistor, or another kind of sensor.

In other embodiments, the device may collect information about the distribution of force on a button or buttons. For example, if button 201 is larger than a typical human finger or thumb, but both edges of button 201 were firmly pressed to initiate a call, this may be suggestive that the button was pressed unintentionally. Similarly, if only a very small part of the button receives pressure, this may be indicative that a sharp object was pressed on the button, which could have been accidental. Measuring the force distribution may be done in any suitable way. For example, button 201 may be flexible and positioned over an array of capacitive switches, each switch closing a connection only when sufficient pressure is exerted on it. The flexible button may transfer pressure only in a region approximating the shape of the object used to press the button, so the pattern of switches registering the press reflects the shape and size of the actuating object.

In some embodiments, the device may collect information about whether a button was pressed by a human finger. The measurement of force distribution on a button as described above may be one technique that suggests whether the button was pressed by a finger or not. (For the purposes of this disclosure, a thumb is considered to be a finger.) Other techniques or combinations of techniques may be used as well. For example, button 201 may include a capacitive touch switch that senses the capacitance of the body when it is touched directly by a person. If a press of button 201 is detected (for example by a mechanical switch under button 201) but the press is not accompanied by detection of a body touching switch 201, this may suggest that the press is less likely to have been intentional.

The estimate of whether button 201 was pressed by a human finger may be further refined by considering the environment surrounding the device at the time the button is pressed. For example, the device may include a temperature sensor that measures the ambient temperature in the vicinity of the device. In the case described above, in which a button press is not accompanied by detection of a human touch on button 201, the lack of a human touch may be discounted if the temperature sensor indicates that the device is in a very cold environment in which the user is likely wearing gloves, which would not register as a touch.

In other embodiments, the device may include a global positioning system (GPS) receiver, which may be utilized in estimating whether a call is unintentional. For example, a device such as device 106 may, upon calling PRC 108, attempt to determine its geographic location, so that the location can be relayed to the customer service representative answering the call, in case knowing the client's location could be helpful in assisting the client. If the device is successful in determining its position using GPS, it may be suspected that the device is outdoors. If not, it may be suspected that the device is indoors. If the device is outdoors, its location may be correlated with weather data available, for example, on the Internet, to estimate the temperature of the immediate environment of the device. Location may also be determined by other methods or combinations of methods. For example WiFi triangulation, SSID look up, and near-field identification by Zigbee, Z-wave, ANT, or other wireless identification may be used individually or in combination. Combinations may include GPS location.

In another technique, a device such as communicator 106 or another kind of device may include one or more force, capacitive, other kinds of sensors in other locations on the body of the device. The device may collect readings from the additional sensors, and the pattern of the readings may be analyzed to see whether or not the pattern is consistent with the device being held in the user's hand. If so, it may be considered likely that the call was intentional. A pattern inconsistent with the device being held in a user's hand may be suggestive that the call was unintentional.

In another embodiment, a button such as button 201 may include a fingerprint reader. A fingerprint reader is a device that can discern the fingerprint ridges on a finger placed against the reader. A device such as communicator 106 may analyze the output of a fingerprint reader within button 201 to determine whether a pattern consistent with a human finger print was present when a call was initiated by a push of the button. If so, it may be considered strong evidence that the call was not unintentional. In other embodiments, the output of the fingerprint reader may be used to identify the person using the device. As with the other kinds of information that may be collected by the device, the fingerprint reader output could be forwarded to PRC 108 for analysis.

In some embodiments, a phone, communicator, or other device may include a camera capable of taking still photographs, video, or both. The device may also have the capability to transmit photos or video to a call recipient. This capability may provide another kind of information that could be helpful in estimating whether a call is intentional or unintentional. For example, upon receiving a call in which the client does not communicate, PRC 108 may (preferably with the client's advance permission to do so in such situations) send a command to the device to take a photograph or capture video and send it to PRC 108. The customer service representative handling the call may be able to view the photograph or video and discern from the device's surroundings additional clues as to whether the call was intentional or unintentional.

In another embodiment, the device may include an accelerometer or other sensor that detects movement of the device, and the output of accelerometer or other sensor may be used in estimating whether a call is intentional or unintentional. For example, the output of an accelerometer in a telephone device can be analyzed to detect falls by a person carrying the device. A call received immediately after a fall may be presumed to be intentional, on the assumption that a person who falls may very likely call PRC 108 for assistance soon after the fall.

In still other embodiments, a client may have previously designated one or more other persons or other entities to serve as contacts should PRC 108 deem it necessary to notify another person or entity about the client's situation. Some or all of these contacts may form a trusted network associated with the client. More information about trusted networks may be found in co-pending U.S. patent application Ser. No. 13/956,234 filed Jul. 31, 2013 and titled "Adaptive System with Call Center and Trusted Network", the entire disclosure of which is incorporated by reference herein.

The client's contacts may provide contact information in various forms, including telephone numbers and the like. Some or all of the contacts may also provide detailed information about their own communications devices. For example, a contact person may provide the SSID (service set identifier) of a WiFi-enabled phone he or she carries, or may provide a Bluetooth device address of a Bluetooth-enabled phone he or she carries, or another kind of identifier that may be detectable by the client's device. When a suspected unintended call is received, PRC 108 may send a command to the client's device to search for nearby devices. The client's device can report any identifiers found, and forward them to PRC 108, which can compare them to device identifiers provided by the client's contacts. If a match is found, PRC 108 may surmise that one of the client's contacts is with the client. If attempts to contact the client directly are not successful, PRC 108 may call any nearby client contact or trusted network entities, in hopes that they can provide immediate confirmation of whether a call from the client was intentional or unintentional.

In other embodiments, PRC 108 may maintain a list of persons who have volunteered to receive requests for assistance and to act as Good Samaritans, coming to the aid of others when possible. When PRC 108 receives a suspected unintended call and is not able to establish verbal contact with the caller, PRC 108 may tap into its volunteer network in hopes of finding someone willing to help establish whether the caller may be in need of assistance, or has simply made a call without realizing it. For example, PRC 108 may send an SMS message to volunteers near the caller (based on GPS or other data), with instructions on how to identify the caller and report their findings. More information about the use of such a network may be found in U.S. patent application Ser. No. 12/981,822 filed Dec. 30, 2010 and titled "Extended Emergency Notification Systems and Methods", the entire disclosure of which is incorporated by reference herein.

In some embodiments, a client's call history may be used in estimating whether a new call is intentional or unintentional on the part of the client. For example, a client's call history may reveal a higher than average incidence of unintended calls. Further, the call history may reveal that the client's unintended calls often occur at a particular time of day, for example when the client is driving to work. A call from that particular client at that particular time, bearing other hallmarks of an unintended call, may be especially suspected to be unintended.

Analysis of a client's calling patterns may conveniently be performed at PRC 108, and the calling pattern information may be used in conjunction with other kinds of collected information in estimating whether a call may have been unintentional.

Figure 4:
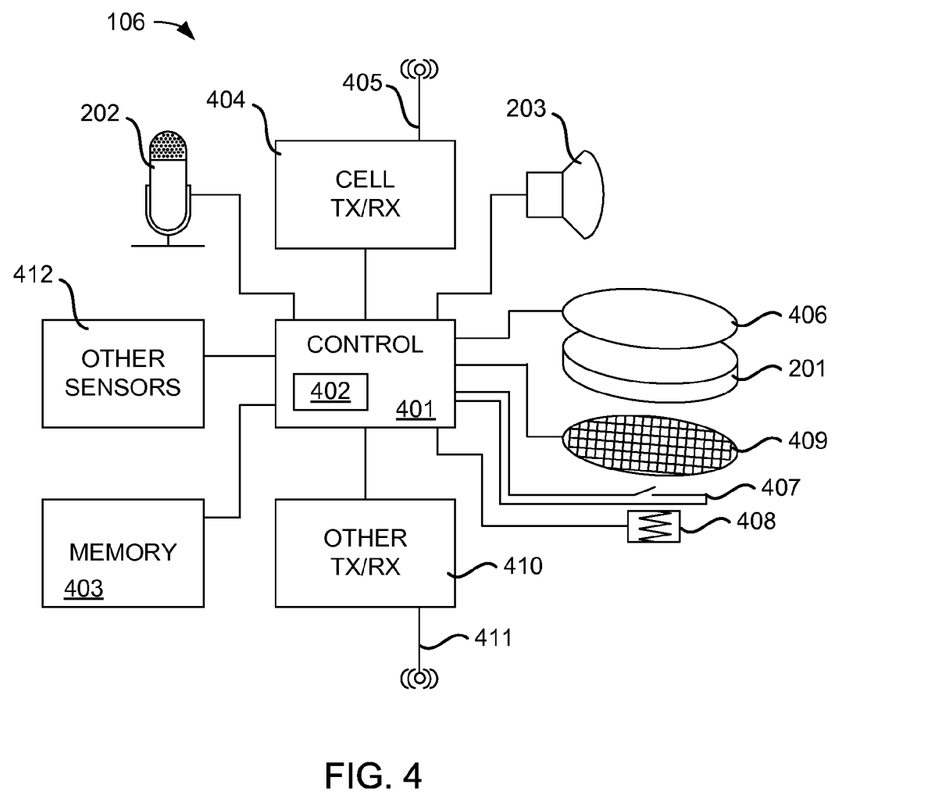
FIG. 4 illustrates a simplified schematic diagram the internal structure of a communicator, according to embodiments.

FIG. 4 illustrates a simplified schematic diagram the internal structure of communicator 106, according to embodiments. A controller 401 controls the operation of communicator 106, and includes a processor 402 executing instructions stored in a memory 403. The instructions configure communicator 106 to perform the functions recited here, as well as other functions. Controller 401 is coupled to a first transceiver 404, which communicates with the cellular telephone network via antenna 405. Microphone 202 and speaker 203 enable two-way voice communication. Speaker 203 may also be used for notifications such as ringing to signal in incoming call, and the like. Button 201 may have one or more associated sensors such as a fingerprint reader 406, a simple contact switch 407, a force sensor 408 for sensing the amount of force being exerted on button 201, or an array of switches 409 for reading the distribution of force on button 201.

One or more other transceivers 410 may be present, enabling communication via Bluetooth, WiFi, or other techniques using one or more additional antennae 411. In addition, one or more other sensors 412 may be provided, for measuring temperature, global position, hand pressure or skin contact on an outer shell of communicator 106, acceleration, or other parameters or combinations of parameters.

While FIG. 4 is directed to an example embodiment of simplified communicator 106, it will be recognized that the invention is not so limited, and may be embodied in other devices such as a fully-featured cellular telephone having such features as a keypad, keyboard, display, touchscreen, or other features.

Figure 5:
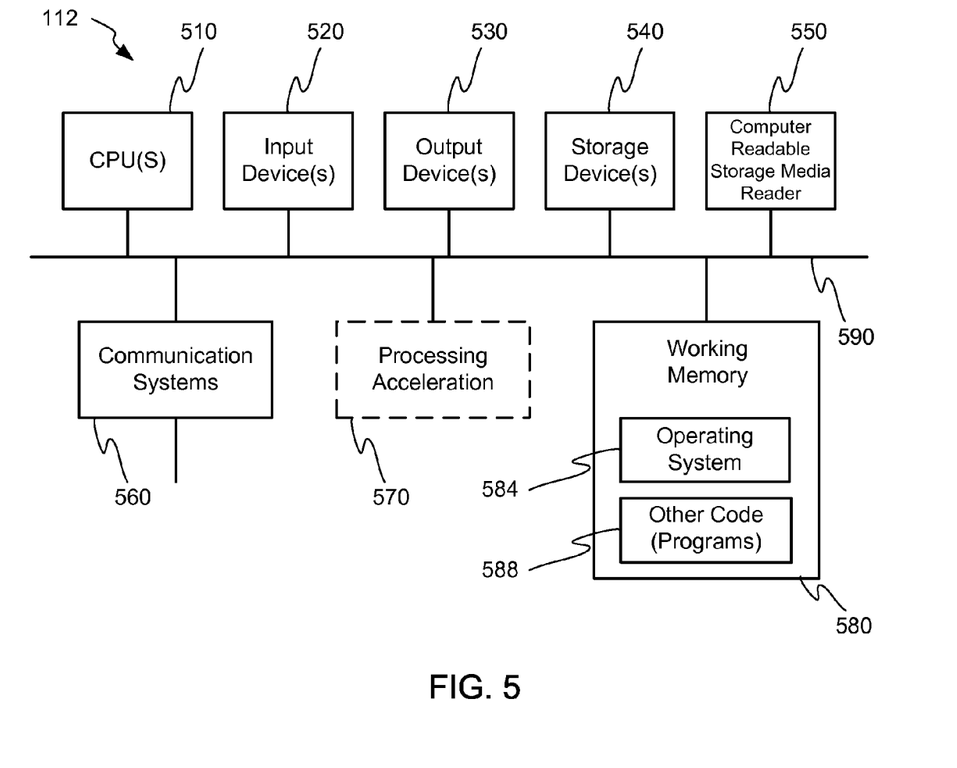
FIG. 5 illustrates a simplified block diagram of an exemplary embodiment of the internal structure of a computer system.

FIG. 5 illustrates a simplified block diagram of an exemplary embodiment of the internal structure of computer system 112. The computer system 112 is shown comprising hardware elements that may be electrically coupled via a bus 590. The hardware elements may include one or more central processing units 510, one or more input devices 520, and one or more output devices 540. The computer system 112 may also include one or more storage device(s) 540. By way of example, storage device(s) 540 may be disk drives, optical storage devices, solid-state storage device such as a random access memory ("RAM") and/or a read-only memory ("ROM"), which can be programmable, flash-updateable and/or the like.

The computer system 112 may additionally include a computer-readable storage media reader 550, a communications system 560 (e.g., a modem, a network card (wireless or wired), an infra-red communication device, Bluetooth™ device, cellular communication device, etc.), and working memory 580, which may include RAM and ROM devices as described above. In some embodiments, the computer system 112 may also include a processing acceleration unit 570, which can include a digital signal processor, a special-purpose processor and/or the like.

The computer-readable storage media reader 550 can further be connected to a computer-readable storage medium, together (and, optionally, in combination with storage device (s) 540) comprehensively representing remote, local, fixed, and/or removable storage devices plus storage media for temporarily and/or more permanently containing computer-readable information. The communications system 560 may permit data to be exchanged with a network, system, computer and/or other component described above.

The computer system 112 may also comprise software elements, shown as being currently located within a working memory 580, including an operating system 584 and/or other code 588. It should be appreciated that alternate embodiments of a computer system 112 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 112 may include code 588 for implementing any or all of the function of the various elements of the architecture as described herein. For example, software, stored on and/or executed by a computer system such as system 112, can provide some of the functions of private response center 108 such as those discussed above. Methods implementable by software on some of these components have been discussed above in more detail.

Figure 6:
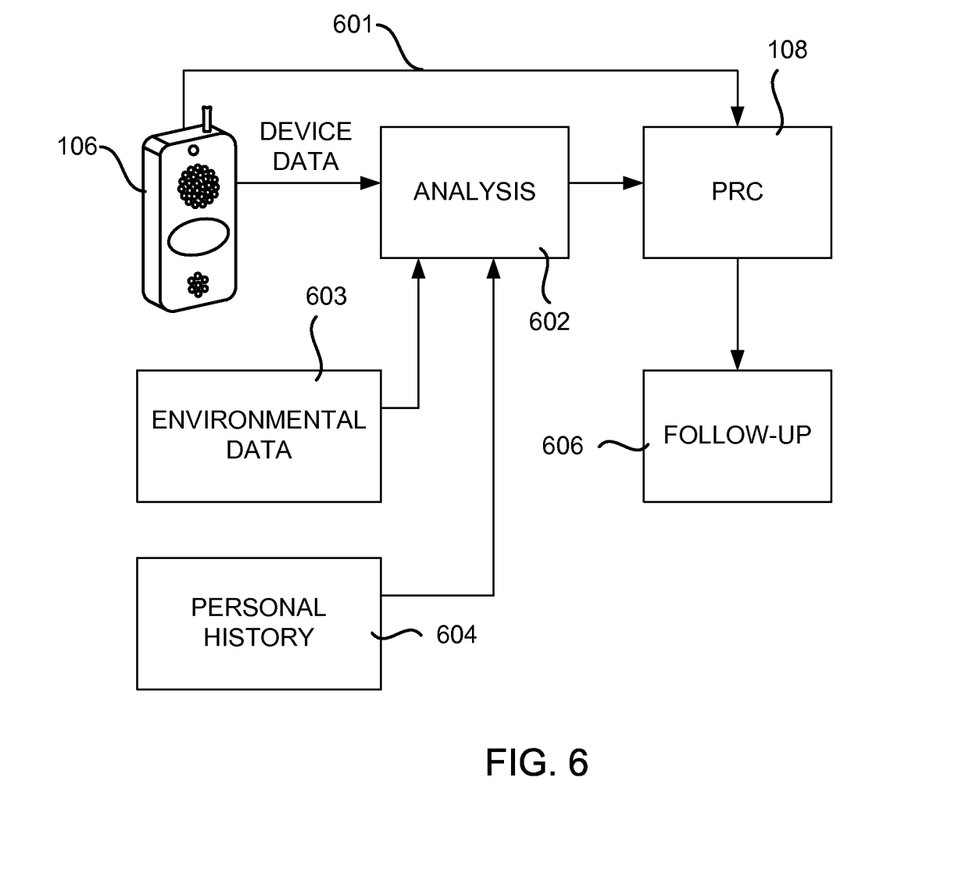
FIG. 6 a schematic diagram of a system in accordance with embodiments of the invention.

FIG. 6 illustrates a schematic diagram of the operation of a system in accordance with embodiments of the invention. Communications device 106 places a call 601 to PRC 108. Upon initiation of the call, communications device 106 collects information usable to estimate whether the call was intentional or unintentional on the part of the caller, and transmits at least some of the information to an analysis engine 602. Analysis engine 602 is shown conceptually, and may reside in communications device 106 or at PRC 108, or parts of the analysis may be performed in both communications device 106 and PRC 108. In some embodiment, at least some of the analysis may be performed by a cloud service accessed by communications device 106, PRC 108, or both. Environmental data 603 may also be provided to analysis engine 602. Environmental data 603 may be collected by communications device 106, may be collected from other sources, or may come from a combination of sources. The personal history 604 of the caller may also be factored into the analysis performed by analysis engine 602.

Analysis engine 602 may use any suitable algorithms, machine learning techniques, or other mathematical techniques for estimating whether a call is intentional or unintentional. For example, different kinds of collected information may be weighted in proportion to their presumed predictive value, and more heavily weighted information may count more strongly in the estimation. For example, a button press lasting several minutes and resulting from a force larger than can be produced by a human finger may be presumed to be a very strong indication that a resulting call is unintentional, while a particular client's call history may be presumed to be a relatively weak predictor. Certain information may affect the weight given to other information. For example, lack of a human touch on the button of a device may be presumed to be moderately indicative of an unintentional call, unless ambient temperature data indicates that the device is being used in a very cold environment, in which case the lack of a touch may be explained by the user's wearing gloves, and therefore the lack of touch may be discounted in the analysis performed by analysis engine 602.

The combined weights of the data indicating that a call may be unintentional may serve as a measure of confidence in the prediction. In other embodiments, different measures of confidence may be used, for example a computed probability that a call is unintentional. Such a probability may be computed from the available information about the call as compared with statistical information gathered over time from many calls from many clients. If the confidence for a particular call exceeds a certain threshold, the call may be suspected to be unintentional.

In some embodiments, PRC 108 may inform a customer service representative about the possibility that a call may be unintentional. For example, PRC 108 may inform the customer service representative of the analysis result for every call, or may only flag suspected unintentional calls for the customer service representative. Any such indication may be presented when a client's personal profile 300 is presented to the customer service representative upon answering the call.

When a call is received that does not result in a verbal connection between the caller and a customer service representative, various follow-up activities may be undertaken. For example, as is discussed above, communications device 106 may try to signal the user by ringing, in hopes the user will answer the ringing phone, and can explain whether the call was unintentional or whether the user requires assistance.

In other embodiments, PRC 108 may prioritize its follow-up activities based on the confidence that a call is intentional or unintentional. For example, a call that was indeterminate or estimated with low confidence to be unintentional may be the subject of repeated in-person follow-up calls by a customer service representative, while a call that is estimated with very high confidence to be unintentional may trigger fewer in-person follow-up calls, and may receive more automated follow-up.

If no direct contact is established with the user of the calling device, other follow-up strategies may be pursued. For example, customer service representatives may periodically call the device to inquire whether the most recent call was intended, and whether the user requires any assistance. In some cases, for example when repeated personal calls from customer service representatives fail to establish contact, automated techniques may be employed. For example, the number of the device may be automatically dialed on a repeating schedule. Once the user of the device answers, the system may immediately connect the call to an available customer service representative, or may use automated methods such as an interactive voice response (IVR) system to try to confirm whether the initial call was intentional or unintentional. If the automated methods are inconclusive, for example if the responses received by the IVR system are unintelligible or indistinct, further human-initiated follow-up may be initiated.

While embodiments have been described above in the context of a private response center, it will be recognized that other embodiments may be implemented in a public safety answering point or other official entity.

It is also to be understood that any workable combination of the features and techniques disclosed herein is also considered to be disclosed.

While the principles of the disclosure have been described above in connection with specific apparatuses and methods, it is to be clearly understood that this description is made only by way of example and not as limitation on the scope of the disclosure.

What is claimed is:

1. A method of operating a device with telephone capability, the method comprising:
   recognizing that an action at one or more user controls of the device with telephone capability indicates that a call is to be made to a particular telephone number;
   automatically collecting information usable to estimate whether the action was intentional or unintentional; and
   placing the call to the particular telephone number regardless of the collected information.

2. The method of claim 1, further comprising:
   estimating, based on the collected information, whether the action was intentional or unintentional; and
   when the estimate indicates that the action is suspected to be unintentional, signaling a user of the device.

3. The method of claim 1, further comprising:
   estimating, based on the collected information, whether the action was intentional or unintentional; and
   when the estimate indicates that the action is suspected to be unintentional, automatically informing the recipient of the call that the call is suspected to be unintentional.

4. The method of claim 1, wherein automatically collecting information usable to estimate whether the action was intentional or unintentional comprises automatically collecting information about the timing of one or more presses of a button on the device.

5. The method of claim 1, wherein automatically collecting information usable to estimate whether the action was intentional or unintentional comprises automatically collecting information about the force used to press a button on the device.

6. The method of claim 5, wherein automatically collecting information usable to estimate whether the action was intentional or unintentional comprises automatically collecting information about the distribution of force used to press a button on the device.

7. The method of claim 1, wherein automatically collecting information usable to estimate whether the action was intentional or unintentional comprises automatically collecting information about whether the action was performed by a human finger.

8. The method of claim 1, wherein automatically collecting information usable to estimate whether the action was intentional or unintentional comprises collecting information about the environment in which the device was operating at the time of the action.

9. The method of claim 1, wherein automatically collecting information usable to estimate whether the action was intentional or unintentional comprises collecting information about a call history of a user of the device with telephone capability.

10. The method of claim 1, further comprising transmitting the collected information to the recipient of the call.

11. The method of claim 10, further comprising:
    receiving a communication from the recipient of the call indicating that the action is suspected to be unintentional; and
    in response to the communication, signaling a user of the device.

12. The method of claim 1, further comprising:
    automatically detecting one or more other electronic devices in the vicinity of the device with telephone capability; and
    transmitting one or more identifiers of the one or more detected other electronic devices to the recipient of the call.

13. A method of operating a call center, the method comprising:
    receiving a call from a device with telephone capability;
    receiving information collected by the device with telephone capability, the information usable to estimate whether the call was intentional or unintentional; and
    estimating, based on the received information, whether the call was intentional or unintentional.

14. The method of claim 13, further comprising retrieving from a database information about a historical pattern of use of the device with telephone capability; and
    estimating, based in part on the historical pattern of use, whether the call was intentional or unintentional.

15. The method of claim 13, further comprising:
    automatically sending an instruction to the device with telephone capability; and
    receiving from the device with telephone capability additional information gathered in response to the instruction.

16. The method of claim 15, wherein the instruction instructs the device with telephone capability to attempt a global positioning system fix and to report the result of the attempt.

17. The method of claim 13, further comprising, when the estimate indicates the call is suspected to be unintentional, informing a customer service representative that the call is suspected to be unintentional.

18. The method of claim 13, further comprising, when the estimate indicates the call is suspected to be unintentional, sending an instruction to the device with telephone capability to signal a user of the device with telephone capability.

19. A method of operating a call center, the method comprising:
    receiving a call from a device with telephone capability; and
    in conjunction with the call, receiving an indication from the device with telephone capability that the call is suspected to be unintentional.

20. The method of claim 19, further comprising:
    automatically sending an instruction to the device with telephone capability; and
    receiving from the device with telephone capability additional information gathered in response to the instruction.

21. The method of claim 19, further comprising sending an instruction to the device with telephone capability to signal a user of the device with telephone capability.

22. A device with telephone capability, the device comprising:

a transceiver for conducting telephone communication;
a computerized controller;
a user input device; and
one or more sensors that produce one or more sensor outputs;
wherein the controller receives the one or more sensor outputs and based at least in part on the one or more sensor outputs estimates whether a call initiated by an actuation of the user input device is intentional or unintentional.

23. The device with telephone capability of claim 22, wherein:
the input device is a button;
one of the one or more sensors senses the timing of one or more actuations of the button; and
the controller estimates whether the call is intentional or unintentional based at least in part on the timing of one or more actuations of the button.

24. The device with telephone capability of claim 22, wherein:
the input device is a button;
one of the one or more sensors senses the force acting on the button; and
the controller estimates whether the call is intentional or unintentional based at least in part on the force.

25. The device with telephone capability of claim 24, wherein:
the input device is a button;
one of the one or more sensors senses the distribution of force acting on the button; and
the controller estimates whether the call is intentional or unintentional based at least in part on the distribution of force.

26. The device with telephone capability of claim 22, wherein:
one of the one or more sensors senses the a characteristic of the ambient environment of the device with telephone capability; and
the controller estimates whether the call is intentional or unintentional based at least in part on the characteristic of the ambient environment.

27. The device with telephone capability of claim 22, wherein:
one of the one or more sensors senses whether the device with telephone capability is in contact with skin.

28. The device with telephone capability of claim 22, wherein the controller forwards information from the one or more sensor outputs to the recipient of the call.

29. The device with telephone capability of claim 22, further comprising a secondary wireless interface, and wherein the controller:
detects one or more other electronic devices in the vicinity of the device with telephone capability; and
transmits one or more identifiers of the one or more detected other electronic devices to the recipient of the call.

30. The device with telephone capability of claim 29, wherein the controller detects the one or more other electronic devices in response to a command received from the recipient of the call.

* * * * *